United States Patent [19]

Thimineur et al.

[11] Patent Number: 4,696,969
[45] Date of Patent: Sep. 29, 1987

[54] EMULSION POLYMERIZED SILICONE EMULSIONS HAVING SILOXANE-BONDED UV ABSORBERS

[75] Inventors: Raymond J. Thimineur, Scotia; William J. Raleigh, Rensselaer, both of N.Y.

[73] Assignee: General Electric Company, Waterford, N.Y.

[21] Appl. No.: 634,935

[22] Filed: Jul. 27, 1984

[51] Int. Cl.[4] .................................. C08K 5/06
[52] U.S. Cl. ..................... 524/762; 524/837
[58] Field of Search .................. 524/762, 837

[56] References Cited

U.S. PATENT DOCUMENTS

| | | | |
|---|---|---|---|
| 2,891,920 | 6/1959 | Hyde et al. | 524/837 |
| 4,288,356 | 9/1981 | Huebner et al. | 524/501 |
| 4,373,060 | 2/1983 | Ching | 524/837 |
| 4,373,061 | 2/1983 | Ching | 524/837 |
| 4,443,579 | 4/1984 | Doin et al. | 524/837 |

Primary Examiner—Lewis T. Jacobs
Attorney, Agent, or Firm—G. L. Loser

[57] ABSTRACT

An aqueous emulsion composition prepared by emulsion polymerization of a mixture consisting essentially of a polydiorganosiloxane, an emulsifier and an ultraviolet light absorbing agent having the formula

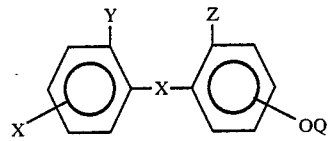

wherein X is C=O or $$C=C-C-OW$$
$$\phantom{C=C-}CN$$

Y is H or OH,
Z is H, OH, OQ or OW, where at least one Z is OH if Y is H,
Q is —CH$_2$(CH$_2$)$_n$ Si(R$^2$)$_x$(OR$^1$)$_y$ and
W is —C$_m$H$_{2m+1}$,
where x=0, 1 or 2, y=1, 2 or 3, x+y=3,
R$^1$ is an alkyl or alkanoyl radical having 1 to 6 carbon atoms,
R$^2$ is an alkyl radical having 1 to 6 carbon atoms,
n=0, 1 or 2 and m=1 to 18; wherein said ultraviolet light absorbing agent is chemically bonded to the polydiorganosiloxane resulting from said emulsion polymerization.

11 Claims, No Drawings

EMULSION POLYMERIZED SILICONE EMULSIONS HAVING SILOXANE-BONDED UV ABSORBERS

BACKGROUND OF THE INVENTION

The present invention relates to novel silicone emulsions. More particularly, the present invention relates to such silicone emulsions and polishes and treatments for fabrics, carpeting and draperies as well as cosmetics for hair and skin care and protective coatings made therefrom, wherein the polysiloxane employed in the emulsion is prepared by emulsion polymerization and wherein an ultraviolet light absorbing agent is added during such emulsion polymerization so that it is chemically bonded to the emulsion polymerized polysiloxane.

Silicone emulsion polishes are commonly used to improve the appearance of, as well as to protect, household products, luggage, marine and automobile vinyl and the like. While silicone emulsion polishes are generally regarded as excellent by those skilled in the art, they suffer from the shortcoming that when they are prepared by conventional mechanical methods the ultraviolet light absorbing agents contained therein are considered to be "fugitive" materials from the standpoint of various external conditions such as weathering, abrasion, heating and the like.

Silicone emulsions can also be diluted for use as a treatment for fabrics, upholstery, carpeting, draperies and the like. Treatment with such silicone emulsions imparts water and dirt repellency to the fabric as well as other advantageous properties.

It is known that silicone emulsions can advantageously be employed in many cosmetic applications such as hair conditioners, make-up, sun tanning lotions and the like.

In each of the foregoing applications, although protection against certain elements, for example, water and dirt, lasts for an extended period of time, protection against the sun's ultraviolet rays invariably is lost much sooner than desired. The present applicants have overcome such shortcoming by their discovery that extended protection against ultraviolet radiation can be obtained by chemically bonding an ultraviolet light absorbing agent directly onto polysiloxane polymers prepared by emulsion polymerization.

Those skilled in the art recognize that emulsions prepared by emulsion polymerization are characterized by extreme stability and extremely fine particle size. Moreover, those skilled in the art appreciate that the problems associated with preparing emulsions by emulsion polymerization are substantially different from those associated with preparing emulsions by mechanical means.

Hyde et al., U.S. Pat. No. 2,891,920, were the pioneers in the field of emulsion polymerization. Hyde et al. recognized that improved emulsions could be prepared by carrying out the polymerization of low molecular weight siloxanes while the siloxanes were dispersed in an aqueous media instead of emulsifying higher molecular weight siloxanes which were dissolved in an organic solvent. In carrying out the method of Hyde et al. the siloxane is first dispersed in the water, preferably with the use of an emulsifying agent, and a suitable polymerization catalyst is thereafter added to promote polymerization to the desired degree. Polymerization is carried out below the boiling point of water, although temperatures above 100° C. can be employed if the polymerization is carried out in a closed system. Hyde et al. reveal that as the polymerization proceeds the viscosity of the siloxane increases but the size of the emulsion droplets decreases and it is believed that this is what causes the extremely stable emulsions obtained by emulsion polymerization.

Oppliger, U.S. Pat. No. 3,208,911, discloses a method for treating hair to improve the appearance, manageability and softness of the hair consisting essentially of submitting the hair to the action of an ionic oil-in-water emulsion, said emulsion being composed of an organosiloxane in an amount of from 0.01 to 90 percent by weight based upon the total weight of the emulsion and an ionic emulsifying agent in an amount of from 2 to 25 percent by weight based upon the weight of the organosiloxane and an alkaline catalyst in an amount of from one alkaline molecule per 100 silicon atoms to one alkaline molecule per 50,000 silicon atoms, inclusive, and the necessary water to give the desired solids content, said alkaline catalyst being selected from the group consisting of (a) $R_4NOH$ and (b) $R_4NX$ admixed with Q, wherein R is alkyl, X is an acid anion, and Q is an alkaline compound selected from the group consisting of ammonia, alkali metal hydroxides, alkali metal carbonates and organic amines, said ionic oil-in-water emulsion being prepared by polymerizing the organosiloxane in an aqueous medium in the presence of said alkaline catalyst until a viscosity of 6.5 cs. to $2.5 \times 10^6$ cs. is obtained.

Findlay et al., U.S. Pat. No. 3,294,725, discloses an emulsion polymerization process similar to that of Hyde et al., however, Findlay et al. teaches the use of a surface active sulfonic acid as a polymerization catalyst rather than a strong mineral acid or strong alkali. A nonionic or anionic emulsifying agent can be employed if so desired.

Axon, U.S. Pat. No. 3,360,491, relates to emulsion polymerization of organosiloxanes wherein the polymerization catalyst is an organic sulfate of the general formula $ROSO_2OH$, wherein R is a monovalent aliphatic hydrocarbon radical of at least 6 carbon atoms. As is the case of Findlay et al., a nonionic or anionic emulsifying agent can be employed if so desired.

Cekada et al., U.S. Pat. No. 3,532,729, teaches the preparation of mercaptosiloxanes by emulsion polymerization.

Sorkin, U.S. Pat. No. 3,624,017, discloses an aqueous emulsion of a copolymer of 80 to 98 mole percent dimethylpolysiloxane and 2 to 20 mole percent $RSiO_{3/2}$ in which R is methyl or vinyl, said emulsion having been prepared by emulsion polymerization of a mixture of dimethylpolysiloxane and $RSiX_3$, in which X is a hydrolyzable group producing a water soluble by-product such as halogen,

—$N(R^1)_2$—$ON=C(R^1)_2$,

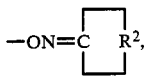

$R^1C(=O)O—$,
$R^1O(R^2O)_n—$ and
—$ON(R^1)_2$ in which $R^1$ is a monovalent hydrocarbon or halocarbon radical and $R^2$ is a divalent hydrocarbon or halohydrocarbon radical. It should be noted that the nitrogen-containing radicals of Sorkin are hydrolyzable and hence will not remain bonded to the siloxane chain in an aqueous medium.

Campbell, U.S. Pat. No. 3,634,297, provides a process for binding a pigment to glass fabric which comprises (A) applying to the glass fabric an aqueous emulsion of a copolymer consisting essentially of (a) 50 to 90 mole percent of $(CH_3)_2SiO$ units and (b) 10 to 50 percent of $RSiO_{3/2}$ units, wherein R is an alkyl or alkenyl radical of 1 to 3 carbon atoms, the 3,3,3-trifluoropropyl radical, or a phenyl radical, said copolymer having been prepared by emulsion polymerization; and a water dispersible pigment; and (B) drying the glass fabric.

Ikoma, U.S. Pat. No. 3,697,469, describes an emulsion polymerization process involving (i) emulsifying, in water containing a salt-type anionic surface active agent, an organosiloxane of the formula $$R_a SiO_{\frac{4-a}{2}}$$

where R is a hydrogen atom or a monovalent hydrocarbon radical or a halogen substituted monovalent hydrocarbon radical, and a has an average value of 1 to 3, and then (ii) contacting said emulsion with an acid-type cationic exchange resin so that said surface active agent may be ion-exchanged from salt type into acid type, thereby acquiring catalytic power and at the same time starting the polymerization of said organosiloxane by making said emulsion an acid medium with a pH value of less than 4.

Backderf, U.S. Pat. No. 3,706,697, relates to aqueous emulsion polymerization of acryloxyalkyl-alkoxysilane, alkyl acrylic esters, and optionally other vinyl monomers to provide copolymers curable at low temperatures. The acryloxy functional site of the silane is said unexpectedly not to hydrolyze upon polymerization and thereby serve as a crosslinking site for reaction with the alkyl acrylic ester.

Hilliard, U.S. Pat. No. 3,898,300, describes an emulsion polymerization method to produce a polymeric styrene-acrylonitrile-polyorganosiloxane composition.

Huebner et al., U.S. Pat. No. 4,288,356, discloses a method of blending an emulsion of an emulsion polymerized compolymer of an organic monomer and an organosilicon monomer and an emulsion of a polydiorganosiloxane to provide a reinforced elastomeric product.

Traver et al., U.S. patent application Ser. No. 613,112, filed May 22, 1984, provides an aqueous emulsion prepared by emulsion polymerizing a diorganopolysiloxane in an aqueous medium in the presence of an emulsifier and thereafter stripping volatiles from the emulsion.

Simoneau et al., U.S. patent application Ser. No. 545,906, filed Oct. 27, 1983, describes aminofunctional silicone emulsions comprising an amino-terminated polydiorganosiloxane, an emulsifier and at least one member selected from the group consisting of (i) a polydimethylsiloxane oil or blend thereof having a viscosity ranging from 50 to 60,000 cps., (ii) an amount of glycerin effective to enhance the shelf stability of the emulsion, and (iii) an ultraviolet radiation absorbing compound of the type employed in the instant invention. A disadvantage of emulsions prepared in accordance with Simoneau et al. is that the emulsion is yellow in color and subsequently yields yellowish films.

SUMMARY OF THE INVENTION

It is one object of the present invention to provide silicone emulsions having UV light absorbing agents bonded directly to a polysiloxane prepared by emulsion polymerization.

It is another object of the present invention to provide emulsion polymerized silicone emulsions which do not yellow.

It is still another object of the present invention to provide a method for preparing silicone emulsions of the present invention.

Still another object of the present invention is to provide silicone polishes, treatments for fabrics, carpeting, draperies and the like and cosmetics for hair and skin care utilizing the silicone emulsions of the present invention and methods for making such compositions.

These and other objects are provided herein by a silicone emulsion consisting essentially of (a) water, (b) an emulsifier or combination of emulsifiers, (c) a diorganopolysiloxane, and (d) an ultraviolet light absorbing agent bonded to the diorganopolysiloxane. Optionally, the emulsion of the present invention can include alkyltrialkoxysilanes such as methyltrimethoxysilane and a polymerization catalyst.

Processes for preparing silicone emulsions and compositions employing such emulsions are also provided.

DESCRIPTION OF THE INVENTION

In one aspect of the present invention silicone emulsions are prepared by emulsion polymerizing an aqueous emulsion of a relatively low molecular weight diorganopolysiloxane and an ultraviolet light absorbing agent. The thus produced silicone emulsions may be used alone or in combination with conventional silicone emulsions to form easily applied protective coatings mentioned hereinabove which exhibit extended resistance to degradation by ultraviolet light and which do not turn yellow.

A principal starting material for both the emulsion and both components of the silicone emulsion polish of the present invention is a linear diorganopolysiloxane base polymer fluid having a viscosity of up to about 100,000 cps. at 25° C. or a cyclic polysiloxane of the general formula:

$$\{R_2SiO\}_{3-9}$$

in which the R substituents may be, independently, hydrogen or a hydrocarbon or substituted hydrocarbon group. Of course, mixtures of cyclics, linear siloxanes or both are permissible. Preferably the substituents are aliphatic hydrocarbon groups such as methyl, ethyl, isopropyl, vinyl, allyl, phenyl, and the like, or substituted aliphatic hydrocarbon groups such as trifluoropropyl and cyanoethyl.

Those skilled in the art, of course, appreciate that linear diorganopolysiloxanes are prepared from cyclic polysiloxanes, preferably octamethylcyclotetrasiloxane (referred to in the art as tetramer or methyl tetramer). Both cyclic polysiloxanes and linear siloxanes can readily be prepared by the artisan or be obtained from commercial sources.

Emulsification of the polymer is assisted by an emulsifying surfactant (emulsifier) which will promote dispersion of the silicone polymer in an aqueous phase. For the purposes of the present invention, alkylphenoxypolyoxyethylene glycol surfactants, such as octylphenoxypolyoxyethylene glycol (TRITON X405; Rohm & Haas) and nonylphenoxypolyoxyethylene glycol (IGEPAL CO850; GAF); and complex quaternary ammonium salts, such as methylpolyoxyethylene (15) cocoammonium chloride (95%, ETHOQUAD C/25; ARMAK) and diemethylsoyammonium chloride (74%, ARQUAD 2S-75; ARMAK). are preferred, though many other emulsifiers are suitable and will suggest themselves to persons skilled in the art. Combinations of such surfactants may also be used. Those skilled in the art will recognize that certain emulsifiers will also be effective as a polymerization catalyst, e.g. if they make the emulsion sufficiently basic.

It should be noted that the ether-type emulsifiers are particularly preferred as when they are utilized higher reaction temperatures may be employed, thereby increasing the rate of polymerization and allowing stripping of volatiles.

The concentration of the siloxane with respect to the water is not critical. All that is required is that the siloxane be emulsified in an effective amount of water. Thus so long as there is enough water to give a continuous aqueous phase the polymerization will proceed in accordance with the present invention. Although polymerization can be carried out at siloxane concentrations of 1% by weight or less, generally polymerization is effected at siloxane concentrations of 20 to 60% by weight.

The most preferred ultraviolet light absorbing agents employed in the practice of the present invention are described in U.S. Pat. No. 4,278,804, to Ashby et al. and which patent is incorporated herein by reference. Of course, other suitable ultraviolet light absorbing agents effective for practicing the present invention can readily be determined by the artisan without undue experimentation. Briefly, Ashby et al. discloses ultraviolet light absorbing agents having the formula:

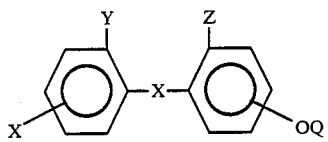

wherein X is

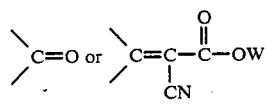

Y is H or OH,

Z is H, OH, OQ or OW, where at least one Z is OH if Y is H,

Q is $-CH_2(CH_2)_nSi(R^2)_x(OR^1)_y$ and W is $-C_mH_{2m+1}$, where $x=0$, 1 or 2, $y=1$, 2 or 3, $x+y=3$, $R^1$ is an alkyl or alkanoyl radical having 1 to 6 carbon atoms, $R^2$ is an alkyl radical having 1 to 6 carbon atoms, $n=0$, 1 or 2 and $m=1$ to 18.

Particularly preferred UV light absorbing agents for practicing the present invention are compounds having the formulas:

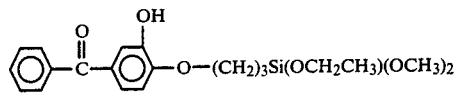

and

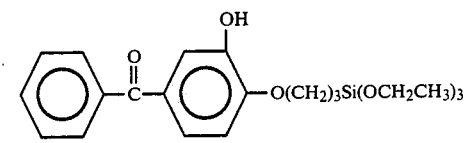

As mentioned, hereinabove, it is critical that the UV light absorbing agent be added during emulsion polymerization of the siloxane so that it will be chemically bonded to the resulting emulsion polymerized polydiorganosiloxane. In this way, the UV light absorbing agent is no longer a fugitive material, but rather will provide protection against ultraviolet radiation as long as the protective polysiloxane remains on the substrate.

An example of another class of suitable, though less preferred, ultraviolet light absorbing agents is para-aminobenzoic acid and its derivatives, for example, its esters having from 1 to 15 or more carbon atoms. Of course, it is also possible to substitute the hydrogen atoms of the amino radical with alkyl radicals such as methyl and ethyl.

As a variation of such para-aminobenzoic acid ultraviolet light absorbing agents it is possible to use a sylated derivative. Such silylated derivatives could be prepared by an addition type reaction, for example, according to the reaction equation:

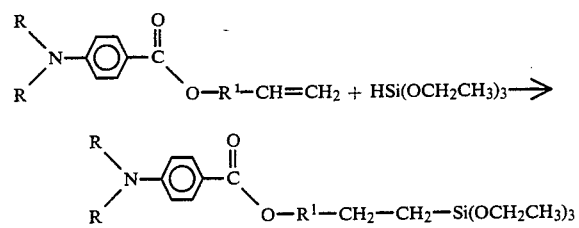

where R is hydrogen or a lower alkyl radical and $R^1$ is a $C_{1-15}$ hydrocarbon radical.

Preferably the ultraviolet light absorbing agent is not added at the start of the emulsion polymerization, though it can be. If it is added near the end of the emulsion polymerization process, for example, within half an hour to an hour prior to completion of the emulsion polymerization process, the UV light absorbing agent will be distributed more uniformly along the polysiloxane chain.

The amount of ultraviolet light absorbing agent utilized in the present invention must be effective to prevent degradation of the underlying substrate to which compositions of the present invention are applied. Generally, amounts ranging from about 0.1 to about 20 weight percent based on the total composition are contemplated. Preferably there is utilized from 1 to 15 weight percent and, more preferably from 2 to 5 weight perecent UV light absorbing agent.

In addition to the foregoing required constituents there may also be included optional ingredients such as a catalyst to promote the emulsion polymerization of the aforementioned polydiorganosiloxane. Such catalyst is especially preferable in those instances where the emulsifier does not also promote polymerization.

Suitable acid and base catalysts are well known to those skilled in the art. Among the preferred catalysts are the strong mineral acids and strong alkalis of Hyde et al., U.S. Pat. No. 2,891,920; the sulfonic acid catalysts of Findlay et al., U.S. Pat. No. 3,294,725, and the organic sulfates of Axon, U.S. Pat. No. 3,360,491. All of these patents are incorporated by reference into the instant disclosure, not only for their teaching as to suitable catalysts, but in their entirety for their broad teaching of how emulsion polymerization can be successfully carried out by the artisan. The artisan will appreciate that it is possible for the emulsifier and the polymerization catalyst to be the same compound.

An especially preferred optional component for use in the present invention is one or more alkyltrialkoxysilanes. The most preferred such alkyltrialkoxysilane is methyltrimethoxysilane. The presence of such component imparts greater durability to protective coatings which utilize the emulsions of the present invention.

Because the alkyltrialkoxysilane functions to endcap the siloxane polymer, i.e. change it from silanol functionality to alkoxy functionality, the alkoxysilane should not be added until the emulsion polymerization process is substantially complete.

It is particularly important that an aminofunctional silane not be used in the emulsion polymerization of the present invention as it imparts an undesirable yellow color to the emulsion as well as to protective coatings prepared therefrom. It is believed that such yellow color is the result of a chemical reaction between the amino groups and the UV light absorbing agents employed in the instant invention. It is also important that the pH of the emulsions of the present invention be substantially neutral or acidic.

Of course other ingredients which do not interfere with the advantageous properties of the present invention may also be utilized. Especially useful optional ingredients include thickeners, antibacterial agents, pigments and the like.

In another aspect of the present invention, the silicone emulsions disclosed hereinbove can be prepared in one step by an acid or base catalyzed equilibrium of relatively low viscosity linear or cyclic polysiloxane monomers, such as octamethylcyclotetrasiloxane, in water in the presence of an emulsifier and an ultraviolet light absorbing agent (i.e. by emulsion polymerization). Preferably, however, the ultraviolet light absorbing agent is not added to the reaction mixture (e.g. emulsion) until the emulsion polymerization nears completion. This will insure that the ultraviolet light screen is more uniformly distributed throughout the resulting polydiorganosiloxane polymers. By "uniformly distributed throughout" it is to be understood that the UV light absorbing agent is chemically bonded to the polydiorganosiloxane in a substantially uniform manner.

As an example of a preferred emulsion polymerization process in accordance with the present invention, the emulsifier(s), water and polymerization catalyst are blended in a single reaction vessel. The polysiloxane monomers are then added and the mixture homogenized and heated (if necessary) to begin polymerization. Emulsion polymerization is continued until the polysiloxane begins to approach the desired viscosity. At this time, typically one half hour to one and one half hours prior to completion of the emulsion polymerization the UV light absorbing agent is added to the reaction mass. Polymerization continues during which time the UV light absorbing agent is chemically bonded to the emulsion polymerized polydiorganosiloxane. About one half hour to an hour prior to completion of the emulsion polymerization the alkyltrialkoxysilane is added to the reaction mass in order to transform the silanol terminated polysiloxanes thus far produced into alkoxy functional polysiloxanes. Neutralization of the catalyst gives the emulsions of the present invention.

It should be understood that the ultraviolet light absorbing agent and alkyltrialkoxysilane can be added at any time during the emulsion polymerization process, including the initial reaction mass without departing from the letter or spirit of the present invention.

The silicone emulsions of the present invention may be used as components in silicone emulsion polish compositions. Suitable polishes according to the present invention would result from combining a silicone emulsion of the present invention with an emulsified polydiorganosiloxane fluid, such as a polydimethylsiloxane (PDMS) fluid, prepared by methods well known to persons skilled in the art using conventional surfactants and water. Furthermore, it has been found that combining the silicone emulsions of the present invention with silanol end-stopped polysiloxane fluid emulsions provides a uniquely servicable and durable protective polish composition. For the purpose of making silanol-containing silicone emulsion polishes of the present invention, silanol terminated PDMS fluids having viscosities in the range of about 600 to about 180,000 centipoise at 25° C. are most preferred.

The ratio of silicone emulsion of the present invention to silicone emulsion, such as PDMS, for preparing a polish composition is well within the ability of the skilled artisan without undue experimentation. Preferably, there is about 1 part silicone emulsion of the present invention to from about 7 to about 12 parts silanol terminated PDMS emulsion of the convention type. Such ratios, of course, should not be considered limiting as the advantageous properties provided by employing the silicone emulsions are provided over a much broader range.

Fabric treatments which employ the emulsions of the present invention are generally prepared by diluting an emulsion of the present invention having a solids content of, for example, 25 to 75 weight percent, to an emulsion having a solids content of from about 1 to about 10 weight percent.

Cosmetic applications employing the emulsions of the present invention can readily be determined by the artisan or found in the literature, such as for example, U.S. Pat. No. 3,208,911.

In order that those skilled in the art will be better able to practice the present invention, the following examples are provided by way of illustration. All parts are by weight unless otherwise stated.

EXAMPLES

EXAMPLE 1

There was added to a stainless steel reaction vessel 56.25 parts water, 4.0 parts Triton X-405 (an octylphenoxypolyoxyethylene glycol emulsifier from Rohm and Haas), and 0.7 parts Ethoquad C/25 (methylpolyoxyethylene (15) cocoammonium chloride from ARMAK Company). These ingredients were rapidly agitated for 15 minutes to provide an aqueous solution. 35 parts octamethylcyclotetrasiloxane (dimethyl tetramer) and 0.45 parts potassium hydroxide catalyst were then added to the vessel. This mixture was blended at 6500 psi and high speed to provide a homogeneous emulsion.

The emulsion was heated at 90° to 95° C. for about five hours to effect polymerization of the dimethyl tetramer and then cooled to about 40° C. An additional 0.5 parts Ethoquad C/25 and 1.4 parts of an ultraviolet light absorbing agent of the formula

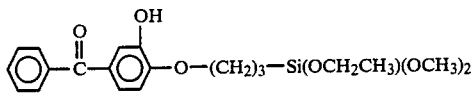

were then added to the reaction mixture. Polymerization was continued for about half an hour at which time 1.7 parts methyltrimethoxysilane was added. The polymerization was allowed to continue at 40° C. for an additional half hour at which time 0.2 parts acetic acid was added to the vessel to neutralize the KOH catalyst. The emulsion was milk white in color, had a pH of 5.6 and contained 35% by weight silicone solids.

EXAMPLE 2

In this example the same procedure as Example 1 was followed except that the ultraviolet light absorbing agent had the formula

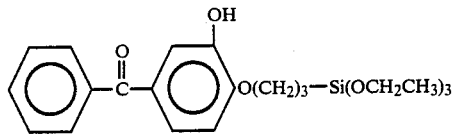

This emulsion was also milk white in color, had a pH of 5.6 and contained 35% by weight silicone solids.

I claim:
1. A method for making an emulsion substantially free of amino-functional units and having a substantially neutral or acidic pH, comprising:
   I. preparing an aqueous emulsion consisting essentially of:
      (a) a low molecular weight polydiorganosiloxane,
      (b) an emulsifier or mixture of emulsifiers,
   II. partially polymerizing said low molecular weight polydiorganosiloxane by emulsion polymerization;
   III. adding to the partially emulsion polymerized polydiorganosiloxane an ultraviolet light absorbing agent, and
   IV. emulsion polymerizing the polydiorganosiloxane of the emulsion of step III such that the ultraviolet light absorbing agent is chemically bonded to the polydiorganosiloxane prepared by said emulsion polymerization.
2. A method as in claim 1 wherein the ultraviolet light absorbing agent has the formula

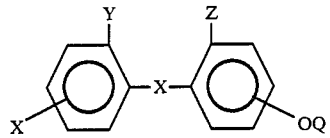

wherein X is

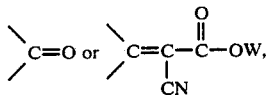

Y is H or OH,
Z is H, OH, OQ or OW, where at least one Z is OH if Y is H,
Q is —CH$_2$(CH$_2$)$_n$Si(R$^2$)$_x$(OR$^1$)$_y$ and W is —C$_m$H$_{2m+1}$,
where x=0, 1 or 2, y=1, 2 or 3, x+y=3,
R$^1$ is an alkyl or alkanoyl radical having 1 to 6 carbon atoms,
R$^2$ is an alkyl radical having 1 to 6 carbon atoms,
n=0, 1 or 2 and m=1 to 18.
3. A method as in claim 1 wherein the low molecular weight polydiorganosiloxane of step I is a cyclopolysiloxane.
4. A method as in claim 2 wherein the ultraviolet light absorbing agent has the formula

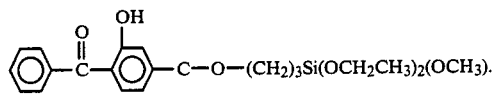

5. A method as in claim 2 wherein the ultraviolet light absorbing agent has the formula

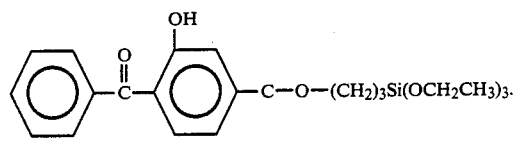

6. A method as in claim 1 wherein the emulsion polymerization is carried out in the presence of a catalyst.
7. A method as in claim 1 wherein the aqueous emulsion of step I further consists essentially of an alkyltrialkoxysilane or mixture of alkyltrialkoxysilanes.
8. A method as in claim 7 wherein the alkyltrialkoxysilane is methyltrimethoxysilane.
9. A method as in claim 1 wherein an alkyltrialkoxysilane or mixture of trialkoxysilanes is added after the ultraviolet light absorbing agent.
10. A method of making an emulsion substantially free of aminofunctional units and having a substantially neutral or acidic pH, comprising:
   I. preparing an aqueous emulsion consisting essentially of:
      (a) a low molecular weight polydiorganosiloxane and
      (b) an emulsifier or mixture of emulsifiers;
   II. partially polymerizing said low molecular weight polydiorganosiloxane by emulsion polymerization;
   III. adding to the partially emulsion polymerized polydiorganosiloxane an ultraviolet light absorbing agent of the formula

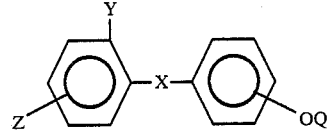

wherein X is

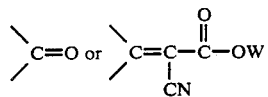

Y is H or OH,

Z is H, OH, OQ or OW, where at least one Z is OH if Y is H,

Q is —$CH_2(CH_2)_nSi(R^2)_x(OR^1)_y$ and W is —$C_mH_{2m+1}$, where $x=0$, 1 or 2, $y=1$, 2 or 3, $x+y=3$, $R^1$ is an alkyl or alkanoyl radical having 1 to 6 carbon atoms, $R^2$ is an alkyl radical having 1 to 6 carbon atoms, $n=0$, 1 or 2 and $m=1$ to 18; and IV. continuing the emulsion polymerization.

11. A method as in claim 1 further comprising adding an alkyltrialkoxysilane after step IV and thereafter continuing the emulsion polymerization until the desired viscosity is obtained.

* * * * *